United States Patent
Tang et al.

(10) Patent No.: US 6,686,933 B1
(45) Date of Patent: Feb. 3, 2004

(54) LIGHTWEIGHT INDICATOR OF DIVERGENCE OF VIEWS FOR COLLABORATIVELY SHARED USER INTERFACE ELEMENTS

(75) Inventors: John C. Tang, Palo Alto, CA (US); James M. A. Begole, Mountain View, CA (US); Nicole Y. Mordecai, Weston, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/479,192

(22) Filed: Jan. 7, 2000

(51) Int. Cl.⁷ .................................................. G09G 5/00
(52) U.S. Cl. ........................................ 345/751; 345/2.2
(58) Field of Search .................................. 345/733, 751, 345/753, 754, 759, 2.1, 2.2; 709/223, 224

(56) References Cited

U.S. PATENT DOCUMENTS

| | | | | |
|---|---|---|---|---|
| 4,974,173 A | * | 11/1990 | Stefik et al. | 345/660 |
| 5,654,726 A | | 8/1997 | Mima et al. | 345/2 |
| 5,913,920 A | * | 6/1999 | Adams et al. | 345/660 |
| 6,151,020 A | * | 11/2000 | Palmer et al. | 345/753 |
| 6,272,539 B1 | * | 8/2001 | Cuomo et al. | 345/733 |

FOREIGN PATENT DOCUMENTS

EP 0 576 183 A1 12/1993

OTHER PUBLICATIONS

Beaudouin–Lafon, M. and Karsenty, A. (1992). Transparency and awareness in a real–time groupware system. Proceedings of the 1992 ACM Symposium on User Interface Software and Technology, ACM Press, Nov. 15–18, 1992, pp. 171–180.

Begole, J., Rosson, M. and Shaffer, C. (1998). Supporting Worker Independence in Collaboration Transparency. Proceedings of the 1998 ACM Symposium on User Interface Software and Technology, ACM Press, Nov. 1–4, 1998, pp. 133–142.

Greenberg, S., Gutwin, C. and Roseman, M. (1996). Semantic Telepointers for Groupware. Proceedings of OzCHI '96 Sixth Australian Conference on Computer–Human Interaction, Hamilton, New Zealand, Nov. 24–27, 1996.

Gutwin, C. Roseman, M. and Greenberg, S. (1996). A Usability Study of Awareness Widgets in a Shared Workspace Groupware System. Proceedings of CSCW 96, pp. 258–267.

* cited by examiner

*Primary Examiner*—Kristine Kincaid
*Assistant Examiner*—Brian Detwiler
(74) *Attorney, Agent, or Firm*—Lahive & Cockfield, LLP

(57) ABSTRACT

A lightweight indicator provides an indication of divergence of views for a collaboratively used user interface element. The lightweight indicator identifies the magnitude of the divergence of views. The user interface may be, for example, a graphical widget, such as a mouse cursor or a scrollbar. The indicator is "lightweight" in that the indicator only subtly modifies the appearance of the user interface element. The indicator is also "lightweight" in that it provides an indication without incurring significant computational or memory overhead.

22 Claims, 8 Drawing Sheets

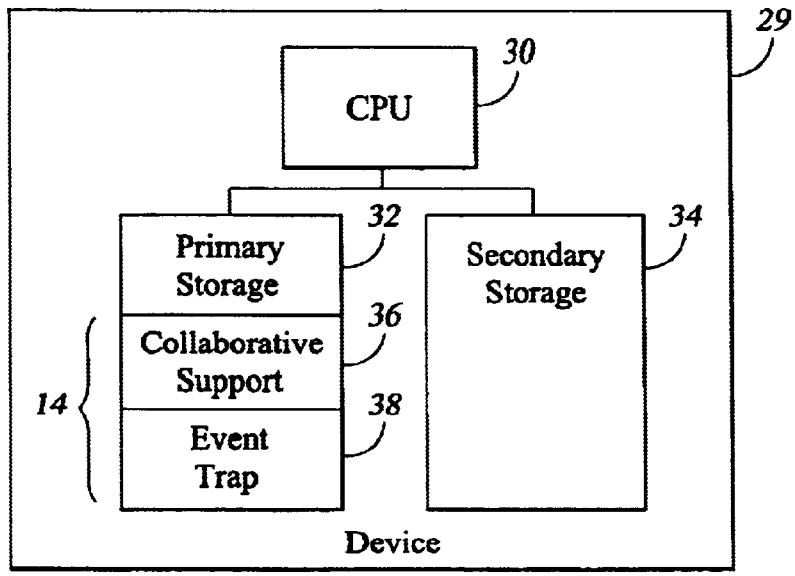
*FIG. 2*
*FIG. 3A*
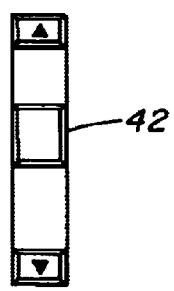
*FIG. 3B*
*FIG. 3C*
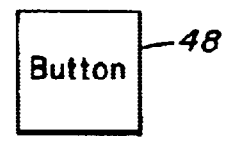
*FIG. 3E*
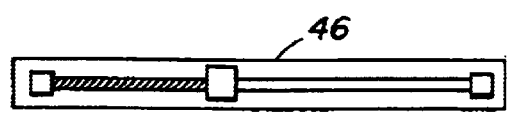
*FIG. 3D*

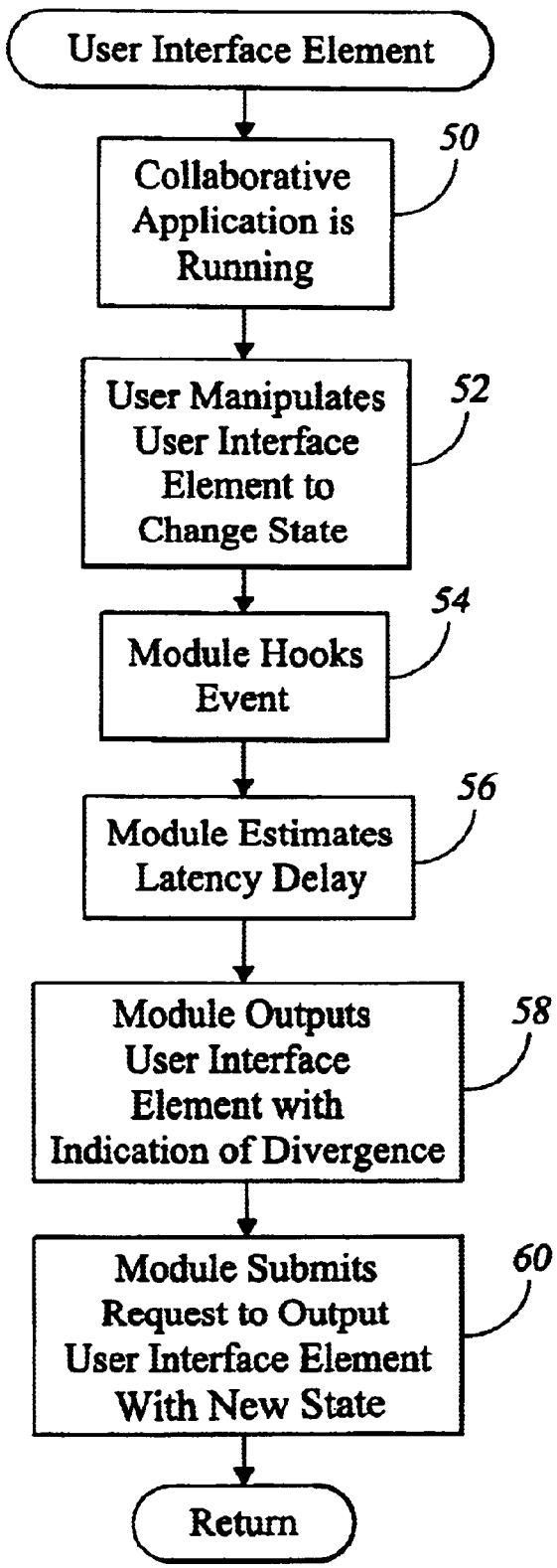
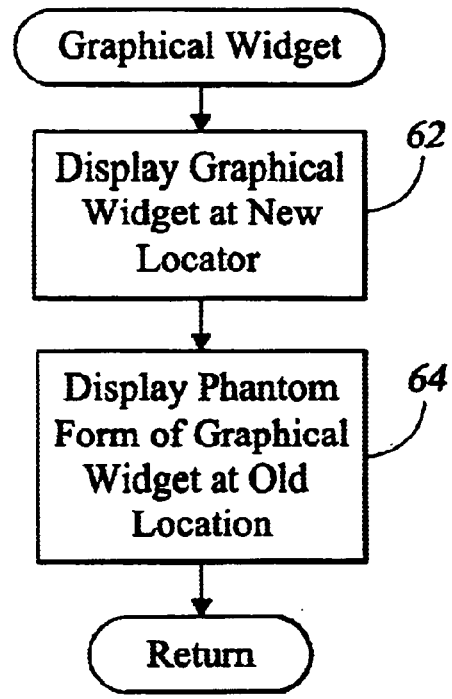
FIG. 4
FIG. 5

LIGHTWEIGHT INDICATOR OF DIVERGENCE OF VIEWS FOR COLLABORATIVELY SHARED USER INTERFACE ELEMENTS

TECHNICAL FIELD

The present invention relates generally to computer systems and more particularly to a lightweight indicator of divergence of views for collaboratively shared user interface elements.

BACKGROUND OF THE INVENTION

Collaborative applications allow parties at different geographical locations to work together in a same computer application over a computer network. With such collaborative applications, there are inherent delays in transmitting data over the network to the collaborating users. The extent of delay experienced by the respective users often varies. Thus, when one user manipulates a user interface element, the updating of the user interface required by the manipulation become evident to the respective users at different times. For example, suppose that a first user manipulates a mouse cursor that is viewed by all of the collaborating users. The display at the first user's location may immediately update, but the displays at other ones of collaborating users are not updated until the appropriate information is conveyed over the computer network to the other users. Such delays are referred to as "latency delays." A latency delay is the difference in time between when a user performs an action locally on a computer and when remote collaborating users see the action occur on their computers.

When remote users are collaboratively sharing a computer application, latency delays cause their views of the application's user interface to diverge from time to time. For example, when a user manipulates an interface widget to a new position, the latency delays imply that some users will not see the widget in the new position for a delayed period of time. During the delayed period of time, the collaborating users do not share a consistent view of the application's user interface. As a result, it is difficult for the users to smoothly coordinate their work.

Latency delays may vary dramatically among collaborating users. Latency delays often range from ¹⁄₁₀ of a second to 3 to 4 seconds. The increased use of intermediate servers and proxies to get through network firewalls has increased latency delays experienced by many users. In addition, increased traffic over computer networks has increased latency delays.

Unfortunately, users tend to be unaware of the divergence of views caused by latency delays. Even in the instances in which the user may be aware of a divergence of views, the user has no way of knowing the amount of time it will take for all of the users to again share a common consistent view of the application's user interface. This problem is particularly acute when users share a computer application that is designed for a single person but that is being used collaboratively with the assistance of an application sharing mechanism. The single user applications do not have any explicit divergence of views delay indicators because they are not explicitly designed for collaborative use.

SUMMARY OF THE INVENTION

The present invention addresses the above-described limitations of collaboratively used applications by providing a lightweight indicator of divergence of view for collaboratively used user interface elements. The lightweight indicator not only identifies if there is any divergence of views but also provides an indication of when the views will converge. As a result of the use of the indicator, a user is aware of any divergence of views and when the views will again coincide so that the user may tailor his/her actions accordingly. The indicator of divergence of view may take the form of graphical output, audio output or a combination thereof. For example, where the user interface element is a graphical widget, the appearance of the graphical widget may be slightly modified to indicate that there is a divergence of views and to identify when the views will fully converge. A "trail" or "shadow" of interim images may be used to identify the extent of time that the views remain inconsistent. Alternatively, audio output may be generated that provides an indication that there is a divergence of views and that identifies the magnitude of the disparity. The magnitude of the disparity may be reflected in the intensity of the audio output or in the frequency of the audio output.

The indicator is "lightweight" in at least two respects. First, the indicator is lightweight in that the indicator does not require a great deal of computational or memory overhead. Second, when the indicator is applied to a graphical widget, the indicator is lightweight in that it only subtly modifies the appearance of the graphical widget. As a result, users still recognize the graphical widget, and the user is not required to look at a separate field of view to identify any non-negligible divergence of views.

In accordance with one aspect of the present invention, a method is practiced in a computer system that is designed for facilitating collaboration via a collaborative application. The computer system includes a first computer having a first output device and a second computer having a second output device. These computers are loosely coupled. In accordance with the method, a user interface element is provided for the collaborative application in an initial state on the first output device and the second output device. In response to manipulation of the user interface element at the first computer, the user interface element is output in a modified state on the first output device and the user interface element on the first output device reflects a divergence of view of a given magnitude between when the user interface element in the modified state is output by the first output device relative to when the user interface element in the modified state is output by the second output device. The user interface element in the modified state at the first output device provides an indication of the magnitude of the divergence of views.

In accordance with another aspect of the present invention, a method is practiced by an intermediary that it is positioned between a first computer system having a display and a second computer system having a display. The intermediary facilitates the display of a common graphical widget at the displays of the first computer system and the second computer system. The position of the graphical widget is updated in response to an event. The updating of the displays at the computer system is begun to reflect the change of position of the graphical widget to a new position. A representation of the graphical widget is caused to be displayed on the one of the displays that updates more quickly. The representation indicates an extent of delay between when the respective displays update to reflect the change of position of the graphical widget to the new position.

In accordance with an additional aspect of the present invention, a mouse cursor is displayed on a display device of a selected user that collaborates with at least one remote user. The mouse cursor is displayed at an original position. The mouse cursor is moved to a new position in response to action by the selected user. The appearance of the mouse cursor is changed to indicate a divergence of views experienced by the remote user in updating a display of the remote user to display the mouse cursor at the new position and to identify the magnitude of the divergence of views. The appearance of the mouse cursor may change so as to have a hollowed out appearance. Furthermore, a trail of shadows that includes a trail of ghost cursors leading from the original position to the new position may be displayed to identify the magnitude of the latency delay.

In accordance with a further aspect of the present invention, a computer system provides assistance for collaborating between a first computer having a display device and a second computer having a display device. The computer system includes a means for intercepting events that occur at the computer and events that occur at the second computer. The computer system includes a means for causing a graphical widget to be displayed on both the first computer and the second computer. The computer system has a means for modifying how the graphical widget appears when displayed on the selected one of the computers to indicate an extent of a divergency of views between the selected computer and another of the computers when the means for intercepting events intercepts an event indicating that the state of the graphical widget has changed due to an action by a user at the selected computer.

BRIEF DESCRIPTION OF THE DRAWINGS

An illustrative embodiment that is consistent with the principles of the present invention will be described below relative to the following drawings.

FIG. 2 depicts a peer device that runs the collaboration module 14 of FIG. 1 in a distributed implementation in more detail.

FIG. 3A depicts a mouse cursor.

FIG. 3B depicts a scrollbar.

FIG. 3C depicts a menu.

FIG. 3D depicts a slider.

FIG. 3E depicts a button.

FIG. 4 is a flow chart illustrating the steps that are performed by the illustrative embodiment to provide a lightweight indicator of divergence of views for a collaboratively used user interface element.

FIG. 5 is a flow chart illustrating the steps that are performed when the user interface element is a graphical widget.

DETAILED DESCRIPTION OF THE INVENTION

An illustrative embodiment, consistent with the principles of the present invention, provides a lightweight indicator of divergence of views for collaboratively used user interface elements. The user interface elements may take many forms, including forms that are graphical widgets. The discussion below will pay special attention to two examples: one where the graphical widget is a mouse cursor and one where the graphical widget is a scrollbar. The lightweight indicator allows a user to be informed that there is a divergence of views relative to actions that manipulate the user interface element and also allow the user to be informed of the magnitude of the divergence of views.

The illustrative embodiment will be described below relative to an implementation via a collaboration module. The collaboration module allows at least two geographically disparate users to collaborate using a collaborative application (e.g. a word processing program). The collaborative application may be designed for collaborative use or may be designed for use by a single user but modified with the assistance of a helping application, such as the SunForum™ tool from Sun Microsystems, Inc. of Palo Alto, Calif., for use in a collaborative fashion. The collaboration module may be implemented in different ways, including on a dedicated server or on peers in a peer to peer environment. With a peer to peer environment, a portion of the collaboration module or a complete copy of the collaboration module runs on each peer.

Figure 1:
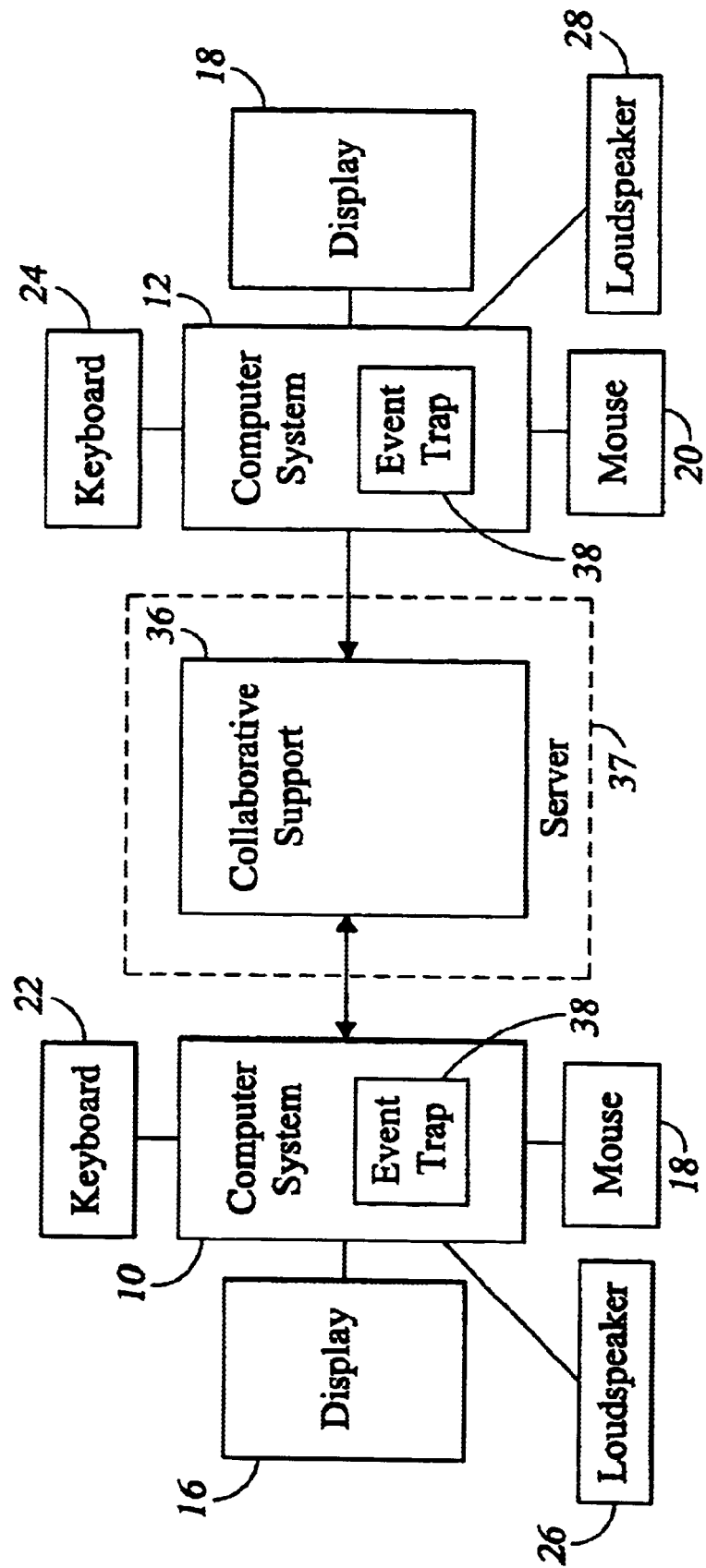
FIG. 1 is a block diagram that depicts an environment suitable for practicing the illustrative embodiment.

FIG. 1 depicts an environment that is suitable for practicing the illustrative embodiment. A computer system 10 interacts with a remotely located computer system 12. The computer system 10 and the computer 12 may include respective video displays 16 and 18. In addition, the computer systems 10 and 12 may include respective input/output devices, such as mice 18 and 20, keyboards 22 and 24, and loudspeakers 26 and 28.

Those skilled in the art will appreciate that the depiction of the environment in FIG. 1 is intended to be merely illustrative and not limiting of the present invention. Additional computer systems may collaborate in practicing the present invention. For example, 3, 4 or even 20 users or more might be able to collaborate in practicing the illustrative embodiment. The depiction of two computer systems 10 and 12 is intended to depict the minimal and most simple case. Moreover, the computer systems 10 and 12 need not have the particular input/output devices depicted in FIG. 1.

The collaboration module 14 is depicted in more detail in FIG. 2. The collaboration module 14 is responsible for facilitating collaboration between computer systems 10 and 12 for an application. The collaboration module 14 tells the computer systems 10 and 12 what to display on their displays 16 and 18. As mentioned above, the collaboration module 14 may be implemented in a centralized fashion or a distributed fashion. In a centralized implementation, the collaboration module may reside on a dedicated server. In a distributed implementation, each collaborating user may have a copy of the collaboration module at the user's machine. Thus, in FIG. 1, the depiction of the collaborative support 36 is intended to encompass both centralized and distributed implementations. A server 37 is shown phantom form to represent the centralized implementation.

FIG. 2 depicts a device which is suitable for running the collaboration module 14. The device 29 includes a central processing unit (CPU) 30 (e.g. a microprocessor). The device 29 may include both primary storage 32 and secondary storage 34. These storages 32 and 34 may contain computer-readable media and may include removable media, such as magnetic disks or optical disks. The primary storage 32 holds the module 14, which includes software for providing collaborative support 36 between the respective computer systems 10 and 12. In a centralized implementation, the collaborative support 36 would be at least partially run on a separate server. The collaboration module 14 also holds an event trap mechanism 38 that traps events that occur at the computer systems 10 and 12. Events such as a mouse movements, keyboard strokes or other types of events are trapped by the collaboration module 14 via the event trap mechanism 38. The event trap mechanism 38 still resides on the separate computer systems 10 and 12 in a centralized implementation.

A user interface element that is collaboratively used in the illustrative embodiment may take many forms. For example, the user interface element may be a graphical element or an audio element. FIGS. 3A–3E depict several examples of suitable graphical elements. For these example cases, each of the graphical elements is a graphical widget. A graphical widget is a predefined graphical element that has predefined behavior. The widgets may be predefined by an operating system or by a set of libraries, for example. FIG. 3A depicts an example of a mouse cursor 40. FIG. 3B depicts an example of a scrollbar 42. FIG. 3C depicts an example of a menu 44. FIG. 3D depicts an example of a slider 46, and FIG. 3E depicts an example of a button 48.

Those skilled in the art will appreciate that the depiction of the graphical widgets in FIGS. 3A–3E is not intended to be exhaustive. The present invention may also be practiced with other types of graphical widgets. Moreover, the present invention need not be practiced with a "graphical widget" per se; rather, the present invention may also be practiced with custom-defined (i.e. defined by an application or user) user interface elements. For purposes of the discussion below, a "user interface element" is a component of a user interface, where user interface is a portion of a program with which a user interacts.

FIG. 4 is flow chart illustrating the steps that are performed in the illustrative embodiment to provide a lightweight indicator of divergence of views for a collaboratively used user interface element. Initially, a collaborative application is running on computer system 10 and computer system 12 with the assistance of the collaboration module 14 (step 50 in FIG. 4). The collaborative application is a program that is being concurrently used collaboratively by multiple users on separate computer systems that are loosely coupled. The computer systems are not tightly coupled (i.e. they are not an integrated group of processors that are organized into an integrated hardware system).

A user then manipulates the user interface element to change the state of the user interface element (step 52 in FIG. 4). The user may use an input device, such as a mouse 18 or 20 or keyboard 22 or 24, to change the state of the user interface element. The event trap facility 38 at the collaboration module 14 traps or captures the event that changed the state of the user interface element (step 54 in FIG. 4). Hence, the collaboration module 14 becomes aware of the event that changed the state of the user interface element. The collaboration module 14 then estimates the anticipated latency delay experienced by remote users (step 56 in FIG. 4). The estimate may estimate a maximum latency delay that represents the greatest latency delay experienced by any of the remote users or may calculate an average latency delay. One approach to estimating latency delay is for the collaboration module 14 to record the times when messages are sent and received and to apply a statistical formula to arrive at a reasonable estimate of round-trip delay. An alternative approach is for the collaboration module 14 to reflect a message back to the sender so that the echoed message follows a route from and back to the sender similar to the route taken to each of the other destinations in the network. The resulting time for the message to arrive back at the sender is an approximation of the latency delay. Those skilled in the art will appreciate that other means for estimating latency delay may be used in practicing the present invention. Moreover, it should be appreciated that the estimate of latency delay represents an estimate of the divergence of views.

The collaboration module 14 outputs the user interface element with an indication of the divergence of views caused by latency delay (i.e. a first "representation") at the computer system where the user manipulated the user interface element to change state (step 56 in FIG. 4). In particular, the collaboration module 14 sends commands to the computer system of the originating user that manipulated the user interface element to modify the user interface element with an indication of the magnitude of the divergence of views (step 58 in FIG. 4). Hence, suppose that a user of computer system 10 modifies the interface element to change the state. The collaboration module 14 sends a command back to the computer system 10 to modify the user interface element to output the user interface element with an indication of the magnitude of divergence of views. In addition, the collaboration module 14 submits a request to the computer systems such as computer system 12 to output the user interface element with the new state (i.e. a second "representation") (step 60 in FIG. 4).

Figure 6A:
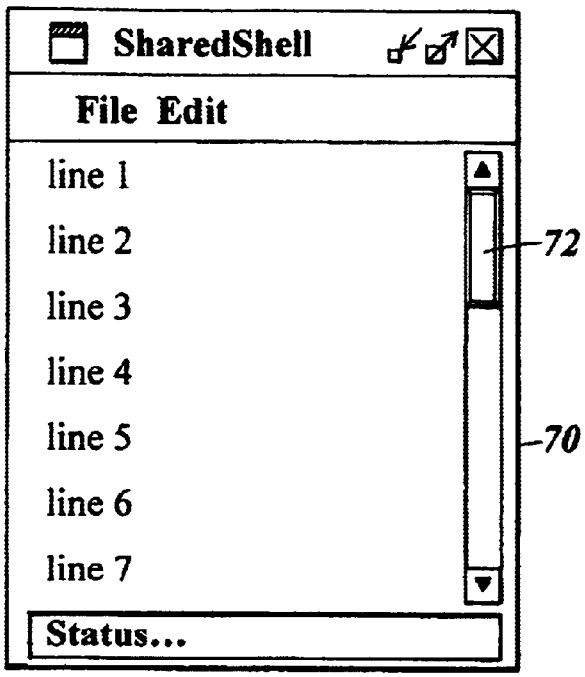
FIGS. 6A, 6B and 6C depict an example of a lightweight indicator of divergence of views that is provided by the illustrative embodiment when the user interface element is a scrollbar.

In order to better appreciate the illustrative embodiment, it is helpful to consider a few example cases. FIG. 5 is a flow chart that illustrates the steps that are performed when the user interface element is a graphical widget. In particular, FIG. 5 is concerned with the instance wherein the graphical widget changes state from an original location to a new location. For the user that manipulated the graphical widget, the graphical widget is displayed at the new location (step 62 in FIG. 5). In addition, a phantom form of the graphical widget is initially displayed at the old location (step 64 in FIG. 5). FIG. 6A depicts an example of a scrollbar 70 that includes a thumb 72. When a user manipulates the scrollbar, such as by dragging it with a mouse or by clicking on arrow buttons in the scrollbar, the appearance of the scrollbar changes to be like that depicted in FIG. 6B. A modified thumb 74 that is light in color is shown at the new position desired by the user. A phantom thumb 72 is depicted at the original position at which the thumb was situated prior to the manipulation by the user.

Figure 7:
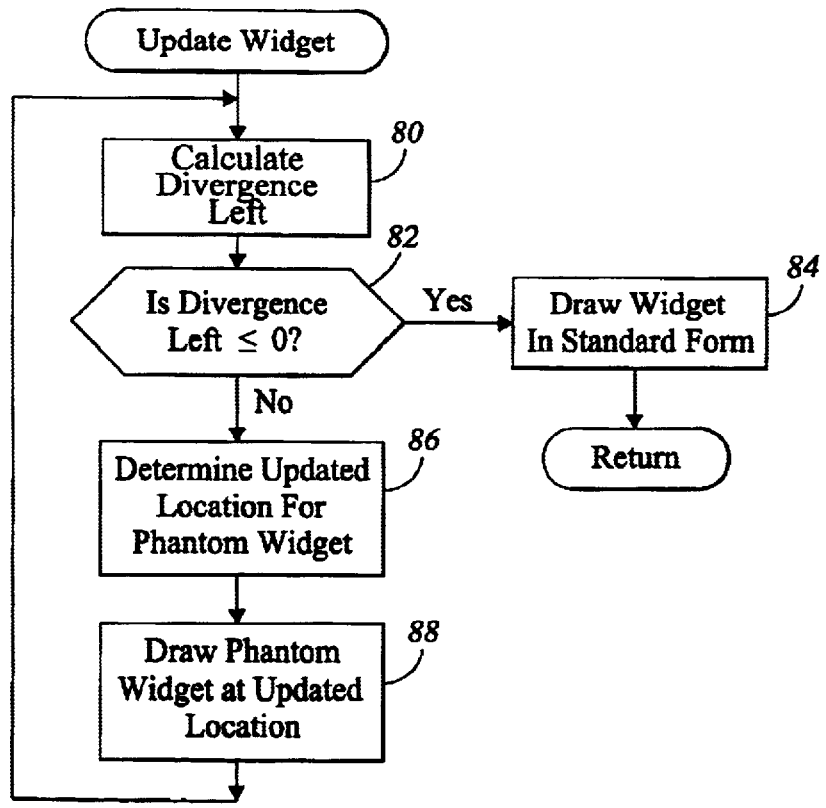
FIG. 7 is a flow chart illustrating the steps that are performed to update the lightweight indicator when the user interface element is a graphical widget in the illustrative embodiment.

As time elapses, the depiction of the user interface is updated to depict the convergence of the views. FIG. 7 is a flow chart illustrating the steps that are performed to update a graphical widget to depict the convergence. Initially, the divergence of views remaining is calculated (step 80 in FIG. 7). Suppose for example that the latency delay was initially calculated as two seconds causing a concomitant divergence of views. One second later, assuming no additional manipulation of the graphical widget, the remote view has begun to "catch up" or "converge." If the latency remaining is greater than zero (see step 82 in FIG. 7), an updated location for the phantom widget is calculated (step 86 in FIG. 7). Specifically, the phantom widget is redrawn at a location along the path from the original location to the new location that is proportional to the amount of divergence of views remaining. For the case described above where the original latency delay is two seconds and one second has passed, the phantom widget is drawn at a location halfway between the original location and the new location (step 88 in FIG. 7). This process repeats until no divergence of views remains. The process may be repeated at fixed intervals such as 1/10 of a second or ½ of a second intervals.

Figure 6B:
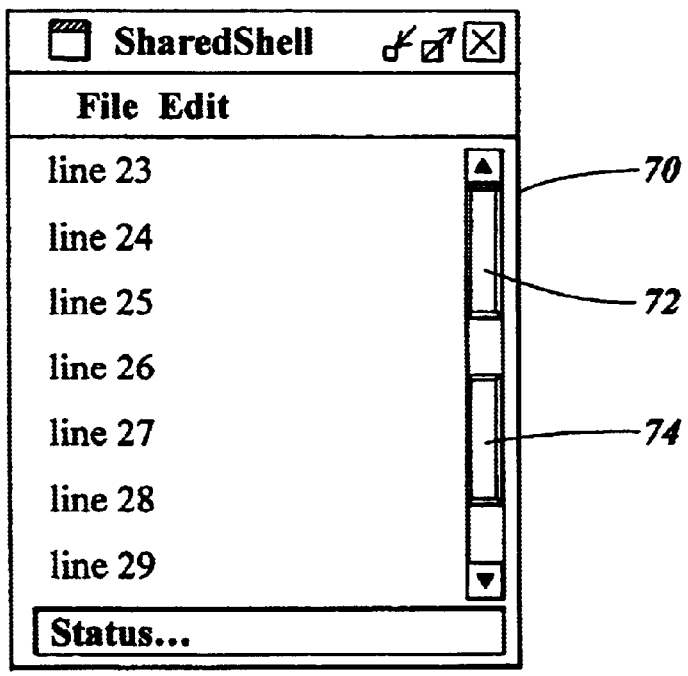
Figure 6C:
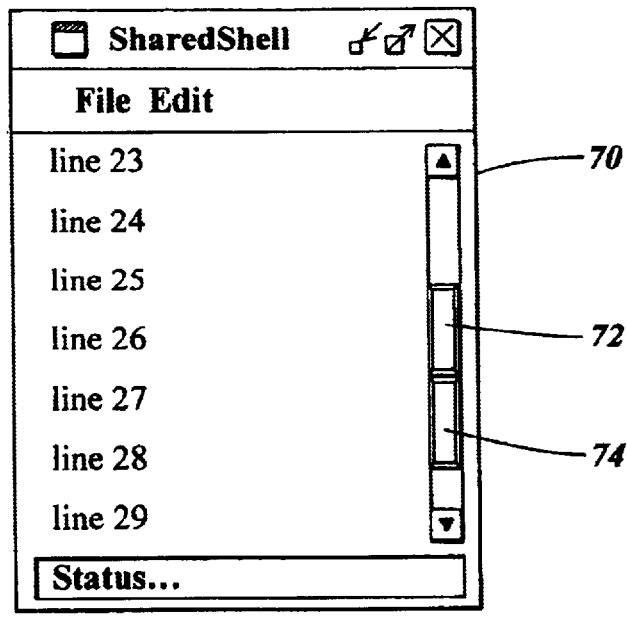

FIG. 6C shows an example of an updated depiction for the scrollbar example. The phantom thumb 72 partially overlaps the modified thumb 74 at the new location. The phantom thumb 72 has been updated from the original location as depicted in FIG. 6B. When no latency remains (see step 82 in FIG. 7), the graphical widget is depicted at the new location in original form (step 84 in FIG. 7).

Figure 8:
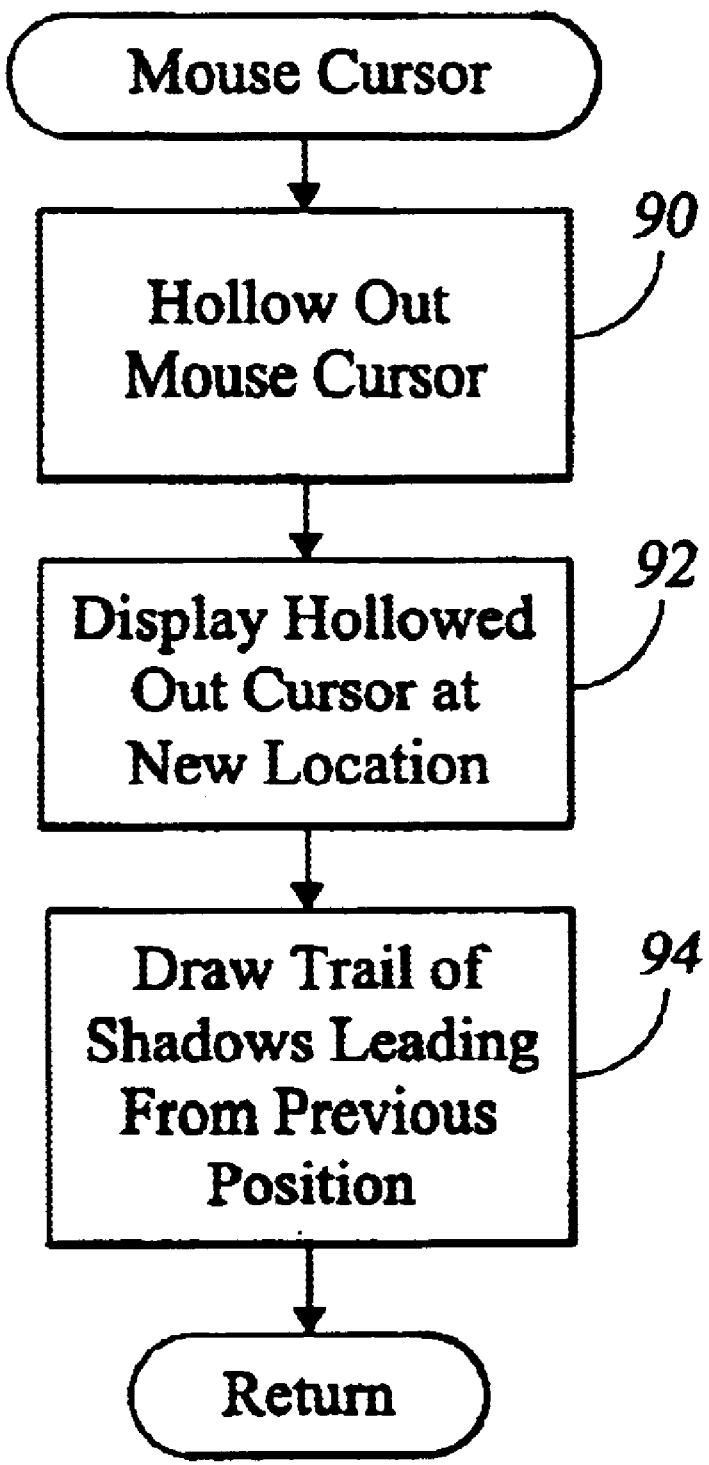
FIG. 8 is a flow chart illustrating the steps that are performed when the user interface element is a mouse cursor.
Figure 9A:
FIGS. 9A, 9B and 9C depict an example of the use of a trail of shadows in the illustrative embodiment when the user interface element is a mouse cursor.
Figure 9B:
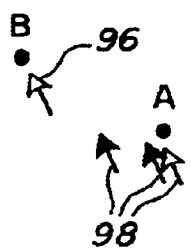
Figure 9C:
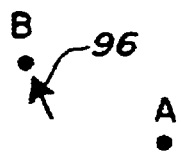

The graphical widget may also be a mouse cursor. FIG. 8 is a flow chart illustrating the steps that are performed in a case where the graphical widget is a mouse cursor. After the mouse cursor is moved from an original location to a new location, the mouse cursor is hollowed-out so that it no longer appears solid (step 90 in FIG. 8). FIG. 9A shows an example where a mouse cursor 96 is solid and points to an original location A. When a user moves the mouse cursor to the new position B, the mouse cursor 96 changes to be hollowed out (step 92 in FIG. 8). A trail of shadows leading from the previous position is then displayed (step 94 in FIG. 8). FIG. 9B shows an example where trail of shadows is formed by phantom cursors 98 that begin at the original position A and begin to track towards the new position B. Eventually, the remote users catch up with the local user and the mouse cursor 96 returns to its original solid form at position B as depicted in FIG. 9C.

Figure 10:
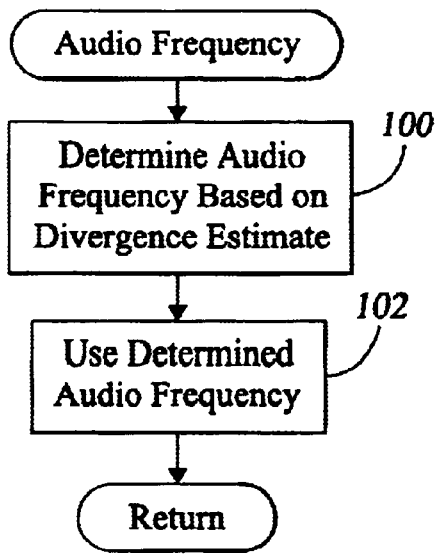
FIG. 10 is a flow chart illustrating the steps that are performed when audio frequency identifies the magnitude of the divergence of views.

The lightweight indicator need not solely be realized as graphical output but rather may instead be realized as audio output or as a combination of audio and graphical output. FIG. 10 is a flow chart depicting one possibility wherein the presence of a divergence of views and the magnitude of the latency delay are reflected in the frequency of audio output. Initially, an audio frequency is determined based upon the divergence of views estimate (step 100 in FIG. 10). This determined audio frequency is then output to provide an indicator to the user of the magnitude of the divergence of views (step 102 in FIG. 10). For example, in one alternative, the frequency of the tone increases as the magnitude of the divergence of views is larger. The tone then decreases in frequency as the divergence of views elapses until ultimately the tone is a constant frequency or silent.

Figure 11:
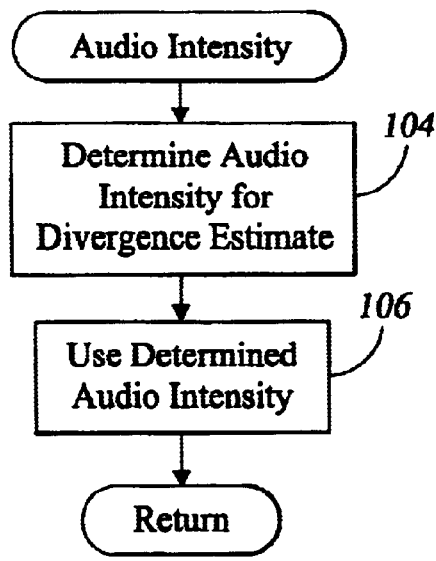
FIG. 11 is a flow chart illustrating the steps that are performed when audio intensity provides an indicator of the magnitude of the divergence of views.

FIG. 11 depicts another alternative wherein the presence of divergence of views and the extent of divergence of views is reflected in audio intensity. Initially, an audio intensity is determined for the divergence of views estimate (step 104 in FIG. 11). This determined audio intensity is then used in output to provide the user with an indication of the magnitude of the divergence of views (step 106 in FIG. 11). For example, the magnitude of the divergence of views may be reflected in a volume of audio output that is output to a user over a loud speaker. The volume may decrease until the views converge.

While the present invention has been described with reference to an illustrative embodiment thereof, those skilled in the art will appreciate that various changes in form and detail may be made without departing from the intended scope of the present invention as defined in the appended claims.

What is claimed is:

1. In a computer system for facilitating collaboration via a collaborative application between a first computer having a first output device and a second computer having a second output device, wherein the first computer and the second computer are loosely coupled, a method comprising;

providing a user interface element for the collaborative application in an initial state on the first output device and the second output device, said user interface element including at least one of a scrollbar, a slider, a menu, and button; and in response to manipulation of the user interface element at the first computer, outputting the user interface element in a modified state on the first output device, wherein the user interface element in the modified state identifies that there is a divergence of views of a given magnitude between when the user interface element in the modified state is output by the first output device and when the user interface element in the modified state is output by the second output device, and the user interface element in the modified state at the first output device provides an indication of the magnitude of the divergence of views.

2. The method of claim 1 further comprising the step of modifying the user interface element in response to a change in the magnitude of the divergence of views to reflect the change in the magnitude of the divergence of views.

3. The method of claim 1 wherein the indication of the magnitude of the divergence of views comprises graphical output.

4. The method of claim 1 wherein the indication of the magnitude of the divergence of views comprises audio output.

5. The method of claim 1 wherein the computer system is a server.

6. A computer-readable medium for use in a computer system for facilitating collaboration via a collaborative application between a first computer having a first output device and a second computer having a second output device, wherein the first computer and the second computer are loosely coupled, said medium holding computer-executable instructions for performing a method, comprising the steps of:

providing a user interface element for the collaborative application in a an initial state on the first output device and the second output device, said user interface element including at least one of a scrollbar, a slider, a menu, and a button; and in response to manipulation of the user interface element at the first computer, outputting the user interface element in a modified state on the first output device, wherein the user interface element in the modified state identifies that there is a divergence of views of a given magnitude between when the user interface element in the modified state is output by the first output device and when the user interface element in the modified state is output by the second output device, and the user interface element in the modified state at the first output device provides an indication of the magnitude of the divergence of views.

7. The computer-readable medium of claim 6 wherein the method further comprises modifying the user interface element in response to a change in the magnitude of the divergence of views to reflect the change in the magnitude of the divergence of views.

8. In an intermediary, positioned between a first computer system having a display and a second computer system having a display, said intermediary facilitating display of a common graphical widget at the displays of both the first computer system and the second computer system, said graphical widget being one of a scrollbar, a slider, a menu, and a button, a method, comprising:

in response to an event, updating a position of the graphical widget;

beginning the updating of the displays at the first computer system and the second computer system to reflect the change in position of the graphical widget to a new position; and causing a representation of the graphical widget to be displayed on the display of the one of the displays that updates more quickly, said representation indicating an extent of delay between when the respective displays update to reflect the change in position of the graphical widget to the new position.

9. The method of claim 8 wherein the representation of the graphical widget is displayed at the new position.

10. The method of claim 8 wherein the representation indicates delay by producing graphical output.

11. The method of claim 10 wherein the graphical output depicts a numerical value for the delay.

12. The method of claim 8 wherein the representation indicates delay by producing audio output.

13. The method of claim 12 wherein an intensity of the audio output identifies the extent of the delay.

14. The method of claim 12 wherein a frequency of the audio output identifies the extent of the delay.

15. The method of claim 8 wherein the method further comprises estimating the extent of the delay.

16. A computer system for assisting in collaboration between a first computer having a display device and a second computer having a display device, said computer system comprising:

means for intercepting events that occur at the first computer and events that occur at the second computer;

means for causing a graphical widget to be displayed on both first computer and the second computer, said graphical widget being one of a scrollbar, a slider, a menu, and a button; and means for modifying how the graphical widget appears when displayed on a selected one of the computers to indicate an extent of divergence of views between the selected computer and another of the computers when the means for intercepting events intercepts an event indicating that a state of the graphical widget has changed due to action by a user at the selected computer.

17. In a computer system for facilitating collaboration via a collaborative application between a first computer having a first output device and a second computer having a second output device, wherein the first computer and the second computer are loosely coupled, a method comprising;

providing a user interface element for the collaborative application in a an initial state on the first output device and the second output device; and in response to manipulation of the user interface element at the first computer, outputting the user interface element in a modified state on the first output device, wherein the user interface element in the modified state identifies with at least audio that there is a divergence of views of a given magnitude between when the user interface element in the modified state is output by the first output device and when the user interface element in the modified state is output by the second output device, and the user interface element in the modified state at the first output device provides an indication of the magnitude of the divergence of views.

18. A computer-readable medium for use in a computer system for facilitating collaboration via a collaborative application between a first computer having a first output device and a second computer having a second output device, wherein the first computer and the second computer are loosely coupled, said medium holding computer-executable instructions for performing a method, comprising the steps of:

providing a user interface element for the collaborative application in a an initial state on the first output device and the second output device; and in response to manipulation of the user interface element at the first computer, outputting the user interface element in a modified state on the first output device, wherein the user interface element in the modified state identifies with at least audio that there is a divergence of views of a given magnitude between when the user interface element in the modified state is output by the first output device and when the user interface element in the modified state is output by the second output device, and the user interface element in the modified state at the first output device provides an indication of the magnitude of the divergence of views.

19. A computer system for assisting in collaboration between a first computer having a display device and a second computer having a display device, said computer system comprising:

means for intercepting events that occur at the first computer and events that occur at the second computer;

means for causing a graphical widget to be displayed on both first computer and the second computer; and means for modifying how the graphical widget appears when displayed on a selected one of the computers to indicate an extent of divergence of views between the selected computer and another of the computers when the means for intercepting events intercepts an event indicating that a state of the graphical widget has changed due to action by a user at the selected computer, wherein the divergence of views is also indicated using audio.

20. In a computer system for facilitating collaboration via a collaborative application between a first computer having a first output device and a second computer having a second output device, wherein the first computer and the second computer are loosely coupled, a method comprising:

providing a user interface element for the collaborative application in an initial state on the first output device and the second output device; and in response to manipulation of the user interface element at the first computer, outputting the user interface element in a modified state on the first output device, wherein the user interface element in the modified state identifies that there is a divergence of views of a given magnitude between when the user interface element in the modified state is output by the first output device and when the user interface element in the modified state is output by the second output device, and the user interface element in the modified state at the first output device provides an indication of the magnitude of the divergence of views, the user interface element including a scrollbar.

21. A computer system for assisting in collaboration between a first computer having a display device and a second computer having a display device, said computer system comprising:

means for intercepting events that occur at the first computer and events that occur at the second computer;

means for causing a graphical widget to be displayed on both first computer and the second computer; and means for modifying how the graphical widget appears when displayed on a selected one of the computers to indicate an extent of divergence of views between the selected computer and another of the computers when the means for intercepting events intercepts an event indicating that a state of the graphical widget has changed due to action by a user at the selected computer, the graphical widget including a scrollbar.

22. An intermediary, positioned between a first computer system having a display and a second computer system having a display, said intermediary facilitating display of a common graphical widget at the displays of both the first computer system and the second computer system, said graphical widget being one of a scrollbar, a slider, a menu, and a button the intermediary comprising:

means for updating a position of the graphical widget in response to an event;

means for beginning the updating of the displays at the first computer system and the second computer system to reflect the change in position of the graphical widget to a new position; and means for causing a representation of the graphical widget to be displayed on the display of the one of the displays that updates more quickly, said representation indicating an extent of delay between when the respective displays update to reflect the change in position of the graphical widget to the new position.

* * * * *

UNITED STATES PATENT AND TRADEMARK OFFICE
CERTIFICATE OF CORRECTION

PATENT NO. : 6,686,933 B1  Page 1 of 1
DATED : February 3, 2004
INVENTOR(S) : Tang et al.

It is certified that error appears in the above-identified patent and that said Letters Patent is hereby corrected as shown below:

Column 5,
Lien 11, replace "holds the module" with -- holds the collaboration module --;

Column 6,
Line 37, replace "request to the" with -- request to the other remote user that the --;

Column 8,
Line 33, replace "comprises graphical output" with -- comprises video output --.
Line 49, replace "in a an initial" with -- in an initial --;

Column 9,
Line 61, replace "in a an initial" with -- in an initial --;

Column 10,
Line 17, replace "in a an initial" with -- in an initial --;

Signed and Sealed this

Seventeenth Day of August, 2004

JON W. DUDAS
*Acting Director of the United States Patent and Trademark Office*